United States Patent
Kim et al.

(10) Patent No.: US 10,837,534 B1
(45) Date of Patent: Nov. 17, 2020

(54) POWER TRANSMISSION APPARATUS FOR VEHICLE

(71) Applicants: Hyundai Motor Company, Seoul (KR); Kia Motors Corporation, Seoul (KR)

(72) Inventors: Chon Ok Kim, Yongin-si (KR); Seong Wook Hwang, Gunpo-si (KR); Soonki Eo, Ansan-si (KR); Minho Chae, Incheon (KR); Sun Sung Kwon, Anyang-si (KR); Yong Uk Shin, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/576,033

(22) Filed: Sep. 19, 2019

(30) Foreign Application Priority Data

Jun. 3, 2019 (KR) ........................ 10-2019-0065338

(51) Int. Cl.
*F16H 37/08* (2006.01)
*F16H 37/04* (2006.01)

(52) U.S. Cl.
CPC ....... *F16H 37/0826* (2013.01); *F16H 37/046* (2013.01); *F16H 2037/047* (2013.01); *F16H 2037/048* (2013.01); *F16H 2200/0065* (2013.01); *F16H 2200/0078* (2013.01); *F16H 2200/2005* (2013.01); *F16H 2200/2041* (2013.01); *F16H 2200/2064* (2013.01)

(58) Field of Classification Search
CPC ............... F16H 37/046; F16H 37/0806; F16H 37/0826; F16H 2037/047; F16H 2037/048; F16H 2200/2005; F16H 2200/2041; F16H 2200/2064
See application file for complete search history.

(56) References Cited

U.S. PATENT DOCUMENTS 9,920,824 B1 * 3/2018 Hwang ................. F16H 37/065

* cited by examiner

*Primary Examiner* — Erin D Bishop
(74) *Attorney, Agent, or Firm* — Morgan, Lewis & Bockius LLP (57) ABSTRACT

A transmission may include a first input shaft, a second input shaft external and selectively connectable to the first input shaft, a third input shaft external to the second input shaft and selectively connectable to the first input shaft, an intermediate shaft, an idle shaft, and an output shaft, a planetary gear set mounted on the intermediate shaft and having first to third elements where the third element and one the first and second elements are selectively connectable to the intermediate shaft and the first and second elements are connected to the third and second input shafts, a plurality of gear sets allowing torque flows between the various shafts and the planetary gear set, first and second synchronizers on the output shaft, receiving torques from the input shafts, and selectively transmitting the received torque to the output shaft, and four clutches.

20 Claims, 5 Drawing Sheets

| Shift-stage No. | Engagement elements | | | | SM1 | | | SM2 | | | Gear ratio | Exemplary nine forward speeds and one reverse speed | Engagement element operation pattern |
|---|---|---|---|---|---|---|---|---|---|---|---|---|---|
| | CL1 | CL2 | CL3 | CL4 | SG1 | N | SG2 | SG3 | N | SG4 | | | |
| 1 | | ● | ● | | ▨ | | | | × | | 1.646 | third speed | CL2+CL3 |
| 2 | | ● | ● | | | | ▨ | | × | | 0.477 | seventh speed | |
| 3 | ● | | ● | | | × | | ▨ | | | 37.500 | | CL1+CL3 |
| 4 | ● | | ● | | ▨ | × | | | | ○ | -8.559 | | |
| 5 | ● | | | | | | | ○ | | ○ | 2.500 | second speed | CL1 |
| 6 | ● | | | | | | | ○ | | ○ | 0.724 | sixth speed | |
| 7 | | ● | | | ○ | | ▨ | ▨ | | | -4.000 | REV | CL2 |
| 8 | | ● | | | ○ | | ○ | | | ▨ | 0.913 | fifth speed | |
| 9 | | | ● | ● | | | ▨ | | × | | 1.389 | fourth speed | CL3+CL4 |
| 10 | | | ● | ● | | | ▨ | ▨ | × | | 0.402 | eighth speed | |
| 11 | | | ● | ● | | × | | ▨ | | | -2.500 | | |
| 12 | | | ● | ● | | × | | ▨ | | ▨ | 0.571 | | |
| 13 | | | ● | | ▨ | | | ▨ | | | 4.167 | first speed | CL3 |
| 14 | | | ● | | ▨ | | | ▨ | | ▨ | 1.973 | | |
| 15 | | | ● | | | | ▨ | ▨ | | | 2.475 | | |
| 16 | | | ● | | | | ▨ | | | ▨ | 0.282 | ninth speed | |

● : operational   ▨ : synchronized and operational   ○ : non-operational but synchronization available   × : neutral

POWER TRANSMISSION APPARATUS FOR VEHICLE

CROSS-REFERENCE TO RELATED APPLICATION

The present application claims priority to Korean Patent Application No. 10-2019-0065338 filed on Jun. 3, 2019, the entire contents of which is incorporated herein for all purposes by this reference.

BACKGROUND OF THE INVENTION

Field of the Invention

The present invention relates to a power transmission apparatus for a vehicle.

Description of Related Art

Research on realizing more shifting stages of an automatic transmission are undertaken to achieve enhancement of fuel consumption and better drivability, and recently, increase of oil price is triggering a hard competition in enhancing fuel consumption of a vehicle.

In the present sense, research on an engine has been undertaken to achieve weight reduction and to enhance fuel consumption by so-called downsizing research on an automatic transmission has been performed to simultaneously provide better drivability and fuel consumption by achieving more shifting stages.

To achieve more shifting stages for an automatic transmission, the number of parts is typically increased, which may deteriorate installability, production cost, weight and/or power flow efficiency.

Therefore, to maximally enhance fuel consumption of an automatic transmission having more shifting stages, it is important for better efficiency to be derived by fewer number of parts.

In the present respect, an eight-speed automatic transmission has been recently introduced, and a planetary gear train for an automatic transmission facilitating more shifting stages is under investigation.

An automatic transmission of eight or more shifting stages typically may include three to four planetary gear sets and five to seven engagement elements (friction elements), and may easily become lengthy, deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of improvement of power delivery performance and fuel consumption An exemplary power transmission apparatus may include a first input shaft fixedly connected to an engine output shaft, a second input shaft formed as a hollow shaft, mounted coaxial with and external to the first input shaft without rotational interference therebetween, and selectively connectable to the first input shaft, a third input shaft formed as a hollow shaft, mounted coaxial with and external to the second input shaft, and selectively connectable to the first input shaft, an intermediate shaft, an idle shaft, and at least one output shaft mounted in parallel with the first, second, and third input shafts, a planetary gear set having first, second, and third rotation elements and mounted on an axis of the intermediate shaft, the third rotation element and one rotation element of the first and second rotation elements being selectively connectable to the intermediate shaft, the first and second rotation elements being connected to the third and second input shafts, a plurality of gear sets, each of which allows at least one torque flow between the intermediate shaft, the first, second, and third input shafts, the idle shaft, the output shaft, and the planetary gear set, a first synchronizer mounted on the output shaft, selectively receiving a torque from the second input shaft through two paths, and transmitting the received torque to the output shaft, a second synchronizer mounted on the output shaft, selectively receiving a torque from the third input shaft through two paths, and transmitting the received torque to the output shaft, and four clutches each of which facilitating selective connection.

The at least one output shaft may include a first output shaft mounted in a torque path between the second and third input shafts and a differential.

The first and third rotation elements of the planetary gear set are selectively connectable to the intermediate shaft. The four clutches may include a first clutch mounted between the first input shaft and the second input shaft, a second clutch mounted between the first input shaft and the third input shaft, a third clutch mounted between the intermediate shaft and the third rotation element of the planetary gear set, and a fourth clutch mounted between the intermediate shaft and the first rotation element of the planetary gear set.

The second and third rotation elements of the planetary gear set may be selectively connectable to the intermediate shaft. The four clutches may include a first clutch mounted between the first input shaft and the second input shaft, a second clutch mounted between the first input shaft and the third input shaft, a third clutch mounted between the intermediate shaft and the third rotation element of the planetary gear set, and a fourth clutch mounted between the intermediate shaft and the second rotation element of the planetary gear set.

The plurality of gear sets may include first, second, third, fourth, fifth, and sixth gear sets. The first gear set may include a first input gear and a first external gear, the first input gear being fixedly connected to the first input shaft, the first external gear being fixedly connected to the intermediate shaft and externally gear-meshed with the first input gear. The second gear set may include a second input gear and a first shifting gear, the second input gear being fixedly connected to the second input shaft, the first shifting gear being rotatably mounted on the first output shaft and externally gear-meshed with the second input gear. The third gear set may include a second external gear, a third input gear, and a second shifting gear, the second external gear being fixedly connected to the second rotation element of the planetary gear set, the third input gear being fixedly connected to the second input shaft and externally gear-meshed with the second external gear, and the second shifting gear being rotatably mounted on the first output shaft and externally gear-meshed with the third input gear. The fourth gear set may include a fourth input gear, a third shifting gear, and an idle gear, the fourth input gear being fixedly connected to the third input shaft, the third shifting gear being rotatably mounted on the first output shaft, the idle gear being fixedly connected to the idle shaft and externally gear-meshed with the fourth input gear and the third shifting gear respectively. The fifth gear set may include a third external gear and a fourth external gear, the third external gear being fixedly connected to the first rotation element of the planetary gear set, the fourth external gear being fixedly connected to the third input shaft and externally gear-meshed with the third external gear. The sixth gear set may include a fifth input gear and a fourth shifting gear, the fifth input gear being fixedly connected to the third input shaft, the fourth shifting gear being rotatably mounted on the first output shaft and externally gear-meshed with the fifth input gear. The plurality of gear sets may further include a seventh gear set including a final reduction gear of a differential, and a first output gear fixedly connected to the first output shaft and externally gear-meshed with the final reduction gear.

The first, second, third, fourth, fifth, and sixth gear sets may be mounted in a listed order from an opposite side of the engine output shaft.

The first synchronizer may selectively connect the first shifting gear of the second gear set and the second shifting gear of the third gear set to the first output shaft. The second synchronizer may selectively connect the third shifting gear of the fourth gear set and the fourth shifting gear of the sixth gear set to the first output shaft.

The at least one output shaft may include first and second output shafts. The first output shaft may be mounted in a torque path between the second input shaft and a differential. The second output shaft may be mounted in a torque path between the third input shaft and a differential.

The first and third rotation elements of the planetary gear set may be selectively connectable to the intermediate shaft. The four clutches may include a first clutch mounted between the first input shaft and the second input shaft, a second clutch mounted between the first input shaft and the third input shaft, a third clutch mounted between the intermediate shaft and the third rotation element of the planetary gear set, and a fourth clutch mounted between the intermediate shaft and the first rotation element of the planetary gear set.

The second and third rotation elements of the planetary gear set may be selectively connectable to the intermediate shaft. The four clutches may include a first clutch mounted between the first input shaft and the second input shaft, a second clutch mounted between the first input shaft and the third input shaft, a third clutch mounted between the intermediate shaft and the third rotation element of the planetary gear set, and a fourth clutch mounted between the intermediate shaft and the second rotation element of the planetary gear set.

The plurality of gear sets may include first, second, third, fourth, fifth, and sixth gear sets. The first gear set may include a first input gear and a first external gear, the first input gear being fixedly connected to the first input shaft, the first external gear being fixedly connected to the intermediate shaft and externally gear-meshed with the first input gear. The second gear set may include a second input gear and a first shifting gear, the second input gear being fixedly connected to the second input shaft, the first shifting gear being rotatably mounted on the first output shaft and externally gear-meshed with the second input gear. The third gear set may include a second external gear, a third input gear, and a second shifting gear, the second external gear being fixedly connected to the second rotation element of the planetary gear set, the third input gear being fixedly connected to the second input shaft and externally gear-meshed with the second external gear, and the second shifting gear being rotatably mounted on the first output shaft and externally gear-meshed with the third input gear. The fourth gear set may include a fourth input gear, a third shifting gear, and an idle gear, the fourth input gear being fixedly connected to the third input shaft, the third shifting gear being rotatably mounted on the second output shaft, and the idle gear fixedly connected to the idle shaft and externally gear-meshed with the fourth input gear and the third shifting gear respectively. The fifth gear set may include a third external gear and a fourth external gear, the third external gear being fixedly connected to the first rotation element of the planetary gear set, the fourth external gear being fixedly connected to the third input shaft and externally gear-meshed with the third external gear. The sixth gear set may include a fifth input gear and a fourth shifting gear, the fifth input gear being fixedly connected to the third input shaft, the fourth shifting gear being rotatably mounted on the second output shaft and externally gear-meshed with the fifth input gear. The plurality of gear sets may further include a seventh gear set that may include a final reduction gear of a differential, and first and second output gears, the first and second output gears being fixedly connected to the first and second output shafts and externally gear-meshed with the final reduction gear.

The first, second, third, fourth, fifth, and sixth gear sets may be mounted in a listed order from an opposite side of the engine output shaft.

The first synchronizer may selectively connect the first shifting gear of the second gear set and the second shifting gear of the third gear set to the first output shaft. The second synchronizer may selectively connect the third shifting gear of the fourth gear set and the fourth shifting gear of the sixth gear set to the second output shaft.

The planetary gear set may be a single pinion planetary gear set having a sun gear, a planet carrier, and a ring gear as the first, second, and third rotation elements respectively.

A power transmission apparatus configured for a vehicle according to an exemplary embodiment of the present invention may realize sixteen shifting stages by combining one simple planetary gear set and two synchronizers to basic four-speed dual-clutch transmission (DCT) structure.

Furthermore, according to a power transmission apparatus configured for a vehicle according to an exemplary embodiment of the present invention, desired shifting stages may be selected from the sixteen shifting stages, and therefore, a transmission may be easily optimized for various specifications of vehicles, facilitating vehicle-specifically improvement of power delivery performance and fuel consumption.

Furthermore, according to a power transmission apparatus configured for a vehicle according to an exemplary embodiment of the present invention, a transmission may be downsized by employing a simple four-speed dual-clutch transmission (DCT) structure, also improving installability.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
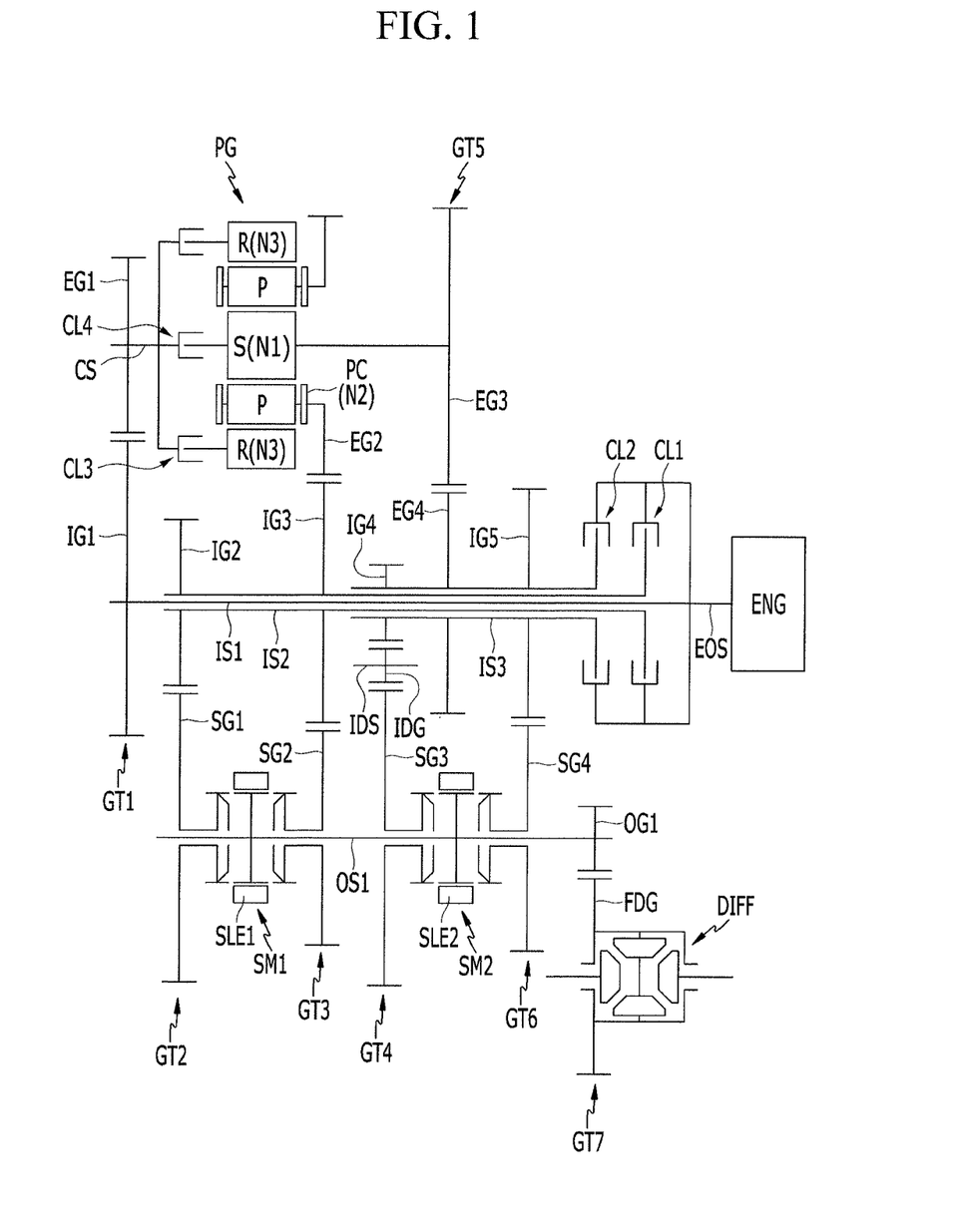
FIG. 1 is a schematic view of a power transmission apparatus configured for a vehicle according to various exemplary embodiments of the present invention.

FIG. 1 is a schematic view of a power transmission apparatus according to various exemplary embodiments of the present invention.

Referring to FIG. 1, a power transmission apparatus according to various exemplary embodiments of the present invention includes first, second, and third input shafts IS1, IS2, and IS3, an intermediate shaft CS, an idle shaft IDS, a first output shaft OS1, a planetary gear set PG, first, second, third, fourth, fifth, sixth, and seventh gear sets GT1, GT2, GT3, GT4, GT5, GT6, and GT7, first and second synchronizers SM1 and SM2, and first, second, third, and fourth clutches CL1, CL2, CL3, and CL4.

A power source of the power transmission apparatus may be various types of a known engine ENG, such as a gasoline engine or a diesel engine.

The first, second, and third input shafts IS1, IS2, and IS3 are disposed at a same axis.

The first input shaft IS1 is an input member, and fixedly connected to an engine output shaft EOS (or a crankshaft) of an engine ENG, and a first input gear IG1 is fixedly mounted on an external circumference of the first input shaft IS1.

The first input shaft IS1 may receive the torque of the engine output shaft EOS through a torque converter.

The second input shaft IS2 is formed as a hollow shaft, mounted coaxial with and external to the first input shaft IS1 without rotational interference therebetween, and selectively connectable to the first input shaft IS1.

The second input shaft IS2 is external to the first input shaft IS1 excluding an end portion of the first input shaft IS1, and second and third input gears IG2 and IG3 are fixedly mounted to the second input shaft IS2 at locations toward the excluded end portion of the first input shaft IS1.

The third input shaft IS3 is formed as a hollow shaft, mounted coaxial with and external to the second input shaft IS2 without rotational interference therebetween, and selectively connectable to the second input shaft IS2.

The third input shaft IS3 is external to the second input shaft IS2 excluding an end portion of the second input shaft IS2, and fourth and fifth input gears IG4 and IG5 are fixedly mounted to the third input shaft IS3.

The intermediate shaft CS is mounted in parallel with the first, second, and third input shafts IS1, IS2, and IS3, and is fixedly mounted with a first external gear EG1 which is externally gear-meshed with the first input gear IG1 at the first input shaft IS1.

The first output shaft OS1 is an output element, and mounted in parallel with the first, second, and third input shafts IS1, IS2, and IS3. First, second, third, and fourth shifting gears SG1, SG2, SG3, and SG4 are rotatably mounted on the first output shaft OS1, and are externally gear-meshed with the second, third, fourth, and fifth input gears IG2, IG3, IG4, and IG5 on the second and third input shafts IS2 and IS3, respectively.

The first output shaft OS1 receives a shifted driving torque through a plurality of gear sets and transmits the shifted driving torque to a differential through a first output gear OG1 and a final reduction gear FDG.

The fourth input gear IG4 and the third shifting gear SG3 are both externally gear-meshed with an idle gear IDG which is fixedly connected to the idle shaft IDS.

The planetary gear set PG is mounted on an axis of the intermediate shaft CS. The planetary gear set PG merely outputs a torque received from the first input shaft IS1, or outputs a shifted torque obtained from torques from the first input shaft IS1 and the second and third input shafts IS2 and IS3.

In more detail, the planetary gear set PG may receive torques from the first input shaft IS1 and the second input shaft IS2, outputting a shifted torque to the third input shaft IS3, or may receive torques from the first input shaft IS1 and the third input shaft IS3 thereby outputting a shifted torque to the second input shaft IS2.

The planetary gear set PG is a single pinion planetary gear set, and includes a sun gear S, a planet carrier PC rotatably supporting a plurality of pinion gear P externally gear-meshed with the sun gear S, and a ring gear R internally gear-meshed with the plurality of pinion gear P engaged with the sun gear S. The sun gear S acts as a first rotation element N1, the planet carrier PC acts as a second rotation element N2, and the ring gear R acts as a third rotation element N3.

The first and third rotation elements N1 and N3 are selectively connectable to the intermediate shaft CS, respectively, and the second and first rotation elements N2 and N1 are respectively connected to the second and third input shafts IS2 and IS3 through corresponding gear sets.

The seven gear sets GT1 to GT7 are hereinafter described in detail.

The first gear set GT1 includes a first input gear IG1 and a first external gear EG1. The first input gear IG1 is fixedly connected to the first input shaft IS1, and the first external gear EG1 is fixedly connected to the intermediate shaft CS and externally gear-meshed with the first input gear IG1.

In the first gear set GT1 of various exemplary embodiments of the present invention, the first external gear EG1 may be selectively connectable to the first rotation element N1 (sun gear S) and the third rotation element N3 (ring gear R) of the planetary gear set PG, through the intermediate shaft CS.

The second gear set GT2 includes a second input gear IG2 and a first shifting gear SG1. The second input gear IG2 is fixedly connected to the second input shaft IS2, and the first shifting gear SG1 rotatably mounted on the first output shaft OS1 and externally gear-meshed with the second input gear IG2.

The third gear set GT3 includes a second external gear EG2, the third input gear IG3, and the second shifting gear SG2. The second external gear EG2 is fixedly connected to the second rotation element N2 (planet carrier PC) of the planetary gear set PG. The third input gear IG3 is fixedly connected to second input shaft IS2 and externally gear-meshed with the second external gear EG2. The second shifting gear SG2 is rotatably mounted on the first output shaft OS1 and externally gear-meshed with the third input gear IG3.

The fourth gear set GT4 includes the fourth input gear IG4, the third shifting gear SG3, and an idle gear IDG. The fourth input gear IG4 is fixedly connected to the third input shaft IS3. The third shifting gear SG3 is rotatably mounted on the first output shaft OS1. The idle gear IDG is fixedly connected to the idle shaft IDS between the fourth input gear IG4 and the third shifting gear SG3, and externally gear-meshed with the fourth input gear IG4 and the third shifting gear SG3.

The fifth gear set GT5 includes a third external gear EG3 and a fourth external gear EG4. The third external gear EG3 is fixedly connected to the first rotation element N1 (sun gear S) of the planetary gear set PG. The fourth external gear EG4 is fixedly connected to the third input shaft IS3 and externally gear-meshed with the third external gear EG3.

The sixth gear set GT6 includes the fifth input gear IG5 and the fourth shifting gear SG4. The fifth input gear IG5 is fixedly connected to the third input shaft IS3. The fourth shifting gear SG4 is rotatably mounted on the first output shaft OS1 and externally gear-meshed with the fifth input gear IG5.

The seventh gear set GT7 includes a final reduction gear FDG of the differential DIFF, and a first output gear OG1.

The first output gear OG1 is fixedly connected to the first output shaft OS1 and externally gear-meshed with the final reduction gear FDG.

The seven gear sets GT1 to GT7 are mounted in a sequence of the first, second, third, fourth, fifth, sixth, and seventh gear sets GT1, GT2, GT3, GT4, GT5, GT6, and GT7 from an opposite side of the engine ENG.

The first, second, third, and fourth shifting gears SG1, SG2, SG3, and SG4 rotatably mounted on the first output shaft OS1 are selectively connectable to the first output shaft OS1 by first and second synchronizers SM1 and SM2.

The first synchronizer SM1 selectively synchronizes the first shifting gear SG1 and the second shifting gear SG2 to the first output shaft OS1, and the second synchronizer SM2 selectively synchronizes the third shifting gear SG3 and the fourth shifting gear SG4 to the first output shaft OS1.

The first and second synchronizers SM1 and SM2 may be formed as a known scheme, and first and second sleeves SLE1 and SLE2 applied to the first and second synchronizers SM1 and SM2 may be operated by actuators which may be controlled by a transmission control unit.

Gear ratios of the first to seventh gear sets GT1 to GT7 may be set in consideration of design requirements of a transmission.

Furthermore, engagement elements of first to fourth clutches CL1, CL2, CL3, and CL4 are mounted between rotation members such as various shafts.

The four clutches CL1 to CL4 are mounted as follows.

The first clutch CL1 is mounted between the first input shaft IS1 and the second input shaft IS2, and selectively connects the first input shaft IS1 and the second input shaft IS2.

The second clutch CL2 is mounted between the first input shaft IS1 and the third input shaft IS3, and selectively connects the first input shaft IS1 and the third input shaft IS3.

The third clutch CL3 is mounted between the intermediate shaft CS and the third rotation element N3 (ring gear R) of the planetary gear set PG, and selectively connects the intermediate shaft CS and the ring gear R.

The fourth clutch CL4 is mounted between the intermediate shaft CS and the first rotation element N1 (sun gear S) of the planetary gear set PG, and selectively connects the intermediate shaft CS and the sun gear S.

The engagement elements of the first, second, third, and fourth clutches C1, C2, C3, and C4 may be realized as multi-plate hydraulic pressure friction devices that are frictionally engaged by hydraulic pressure, however, it may not be understood to be limited thereto, since various other configuration that are electrically controllable may be available.

In the disclosure, when two or more members are described to be "fixedly connected", where the member may be any of a shaft, an input shaft, an output shaft, a rotation member, and a transmission housing, it means that the fixedly connected members always rotate at a same speed. That is, rotation elements and/or shafts fixedly interconnected rotate in a same rotating direction and at a same rotation speed.

When two or more members are described to be "selectively connectable" by an engagement element, it means that the selectively connectable members rotate separately when the engagement element is not engaged, and rotates at a same speed when the engagement element is engaged. It may be understood that in the case that a member is "selectively connectable" with a transmission housing by an engagement element, the member may be stationary when the engagement element is engaged.

Figure 2:
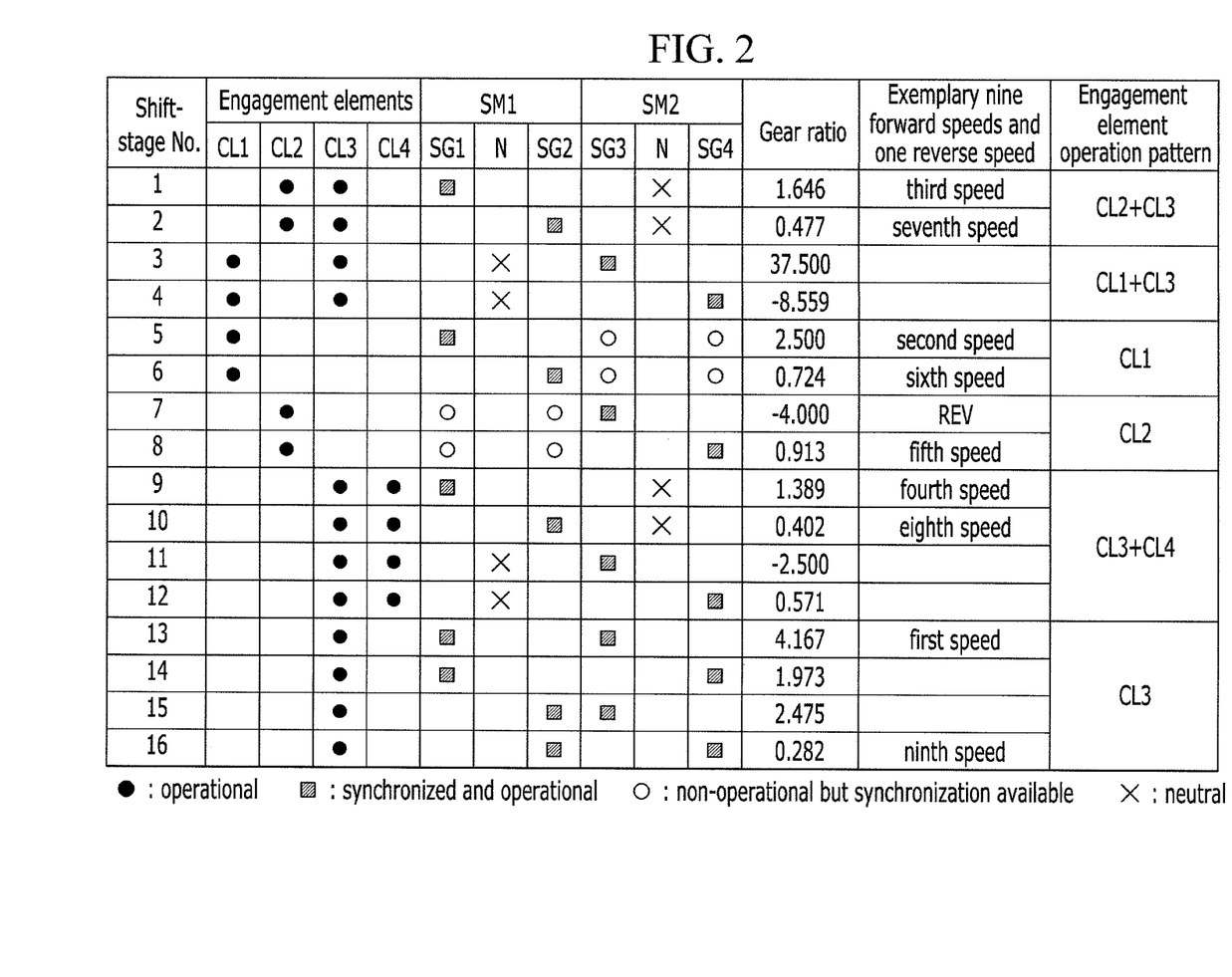
FIG. 2 is a shifting operation chart for a power transmission apparatus configured for a vehicle according to various exemplary embodiments of the present invention.

FIG. 2 is a shifting operation chart for a power transmission apparatus according to various exemplary embodiments of the present invention, and the power transmission apparatus according to various exemplary embodiments performs shifting operation as follows.

A power transmission apparatus according to various exemplary embodiments may realize a plurality of shifting stages by selection operation of the engagement elements of the four clutches CL1 to CL4 and the two synchronizers SM1 and SM2.

The exemplary power transmission apparatus may realize sixteen shifting stages that include two shifting stages by the operation of the first synchronizer SM1 under the simultaneous operation of the second and third clutches CL2 and CL3, two shifting stages by the operation of the second synchronizer SM2 under the simultaneous operation of the first and third clutches CL1 and CL3, two shifting stages by the operation of the first synchronizer SM1 under the operation of the first clutch CL1, two shifting stages by the operation of the second synchronizer SM2 under the operation of the second clutch CL2, four shifting stages by the operation of the first synchronizer SM1 or second synchronizer SM2 under the simultaneous operation of the third and fourth clutches CL3 and CL4, and four shifting stages by the operation of the first and second synchronizers SM1 and SM2 under the operation of the third clutch CL3.

A power transmission apparatus according to various exemplary embodiments may achieve a desired number of shifting stages selected from the available sixteen shifting stages depending on desired characteristic of a transmission.

When gear ratios of respective gear sets GT1 to GT7 and PG are set as follows, gear ratios of the sixteen shifting stages may be obtained as shown in FIG. 2.

For example, gear ratios of the respective gear sets GT1 to GT6 and SPG may be formed as follows.

The gear ratio of the first external gear EG1 to the first input gear EG1 in the first gear set GT1 may be 0.250.

The gear ratio of the first shifting gear SG1 to the second input gear IG2 in the second gear set GT2 may be 2.500.

The gear ratio of the third input gear IG3 to the second external gear EG2 in the third gear set GT3 may be 0.450.

The gear ratio of the second shifting gear SG2 to the third input gear IG3 in the third gear set GT3 may be 0.724.

The gear ratio of the third shifting gear SG3 to the fourth input gear IG4 in the fourth gear set GT4 may be −4.000.

The gear ratio of the third external gear EG3 to the fourth external gear EG4 in the fifth gear set GT5 may be 0.400.

The gear ratio of the fourth shifting gear SG4 to the fifth input gear IG5 in the sixth gear set GT6 may be 0.913.

The gear ratio of the final reduction gear FDG to the first output gear OG1 in the seventh gear set GT7 may be 3.667.

The gear ratio of the planetary gear set PG may be 1.400.

[First Shift-Stage]

In the first shift-stage, while the second and third clutches CL2 and CL3 are under operation, the first synchronizer SM1 is controlled to synchronously connect the first shifting gear SG1 and the first output shaft OS1.

As such, the torque of the engine ENG is input to the first rotation element N1 of the planetary gear set PG by the operation of the second clutch CL2 through the first input shaft IS1, the second clutch CL2, the third input shaft IS3, and the fifth gear set GT5, and simultaneously input to the third rotation element N3 of the planetary gear set PG by the operation of the third clutch CL3 through the first input shaft IS1, the first gear set GT1, and the third clutch CL3.

In the planetary gear set PG, the first rotation element N1 receives a torque according to the gear ratio of the fifth gear set GT5, and the third rotation element N3 receives a torque according to the gear ratio of the first gear set GT1.

The torques of the first and third input shafts IS1 and IS3 are shifted in the planetary gear set PG according to the rotation speed difference of the first and third rotation elements N1 and N3 thereby outputting the shifted torque to the second rotation element N2, and the torque of the second rotation element N2 is shifted while passing through the third gear set GT3, the second gear set GT2, the first output shaft OS1, the first output gear OG1, and the final reduction gear FDG to be transmitted to the differential DIFF.

In the first shift-stage, torques of the first and third input shafts IS1 and IS3 are primarily shifted by the gear ratios of the first and fifth gear sets GT1 and GT5 and by the rotation speed difference of the first and third rotation elements N1 and N3 in the planetary gear set PG, and secondarily shifted by the gear ratios of the third and second gear sets GT3 and GT2, afterwards being transmitted to the first output shaft OS1.

In the instant case, the second synchronizer SM2 is maintained to a neutral state, and the torque of the third input shaft IS3 is not passed to the first output shaft OS1 through the fifth gear set GT5 and the sixth gear set GT6.

[Second Shift-Stage]

In the second shift-stage, while the second and third clutches CL2 and CL3 are under operation, the first synchronizer SM1 is controlled to synchronously connect the second shifting gear SG2 and the first output shaft OS1.

As such, the torque of the engine ENG is input to the first rotation element N1 of the planetary gear set PG by the operation of the second clutch CL2 through the first input shaft IS1, the second clutch CL2, the third input shaft IS3, and the fifth gear set GT5, and the fifth gear set GT5, and simultaneously input to the third rotation element N3 of the planetary gear set PG by the operation of the third clutch CL3 through the first input shaft IS1, the first gear set GT1, and the third clutch CL3.

In the planetary gear set PG, the first rotation element N1 receives a torque according to the gear ratio of the fifth gear set GT5, and the third rotation element N3 receives a torque according to the gear ratio of the first gear set GT1.

The torques of the first and third input shafts IS1 and IS3 are shifted in the planetary gear set PG according to the rotation speed difference of the first and third rotation elements N1 and N3 thereby outputting the shifted torque to the second rotation element N2, and the torque of the second rotation element N2 is shifted while passing through the third gear set GT3, the first output shaft OS1, the first output gear OG1, and the final reduction gear FDG to be transmitted to the differential DIFF.

In the first shift-stage, torques of the first and third input shafts IS1 and IS3 are primarily shifted by the gear ratios of the first and fifth gear sets GT1 and GT5 and by the rotation speed difference of the first and third rotation elements N1 and N3 in the planetary gear set PG, and secondarily shifted by the gear ratio of the third gear set GT3, afterwards being transmitted to the first output shaft OS1.

In the instant case, the second synchronizer SM2 is maintained to a neutral state, and the torque of the third input shaft IS3 is not passed to the first output shaft OS1 through the fifth gear set GT5 and the sixth gear set GT6.

[Third Shift-Stage]

In the third shift-stage, while the first and third clutches CL1 and CL3 are under operation, the second synchronizer SM2 is controlled to synchronously connect the third shifting gear SG3 and the first output shaft OS1.

As such, the torque of the engine ENG is input to the second rotation element N2 of the planetary gear set PG by the operation of the first clutch CL1 through the first input shaft IS1, the first clutch CL1, the second input shaft IS2, and the third gear set GT3, and the fifth gear set GT5, and simultaneously input to the third rotation element N3 of the planetary gear set PG by the operation of the third clutch CL3 through the first input shaft IS1, the first gear set GT1, and the third clutch CL3.

In the planetary gear set PG, the second rotation element N2 receives a torque according to the gear ratio of the third gear set GT3, and the third rotation element N3 receives a torque according to the gear ratio of the first gear set GT1.

The torques of the first and second input shafts IS1 and IS2 are shifted in the planetary gear set PG according to the rotation speed difference of the second and third rotation elements N2 and N3 thereby outputting the shifted torque to the first rotation element N1, and the torque of the first rotation element N1 is shifted while passing through the fifth gear set GT5, the fourth gear set GT4, the first output shaft OS1, the first output gear OG1, and the final reduction gear FDG to be transmitted to the differential DIFF.

In the third shift-stage, torques of the first and second input shafts IS1 and IS2 are primarily shifted by the gear ratios of the first and third gear sets GT1 and GT3 and by the rotation speed difference of the second and third rotation elements N2 and N3 in the planetary gear set PG, and secondarily shifted by the gear ratios of the fifth and fourth gear sets GT5 and GT4, afterwards being transmitted to the first output shaft OS1.

In the instant case, the first synchronizer SM1 is maintained to a neutral state, and the torque of the second input shaft IS2 is not passed to the first output shaft OS1 through the second gear set GT2 and the third gear set GT3.

[Fourth Shift-Stage]

In the fourth shift-stage, while the first and third clutches CL1 and CL3 are under operation, the second synchronizer SM2 is controlled to synchronously connect the fourth shifting gear SG4 and the first output shaft OS1.

As such, the torque of the engine ENG is input to the second rotation element N2 of the planetary gear set PG by the operation of the first clutch CL1 through the first input shaft IS1, the first clutch CL1, the second input shaft IS2, and the third gear set GT3, and the fifth gear set GT5, and simultaneously input to the third rotation element N3 of the planetary gear set PG by the operation of the third clutch CL3 through the first input shaft IS1, the first gear set GT1, and the third clutch CL3.

In the planetary gear set PG, the second rotation element N2 receives a torque according to the gear ratio of the third gear set GT3, and the third rotation element N3 receives a torque according to the gear ratio of the first gear set GT1.

The torques of the first and second input shafts IS1 and IS2 are shifted in the planetary gear set PG according to the rotation speed difference of the second and third rotation elements N2 and N3 thereby outputting the shifted torque to the first rotation element N1, and the torque of the first rotation element N1 is shifted while passing through the fifth gear set GT5, the sixth gear set GT6, the first output shaft OS1, the first output gear OG1, and the final reduction gear FDG to be transmitted to the differential DIFF.

In the fourth shift-stage, torques of the first and second input shafts IS1 and IS2 are primarily shifted by the gear ratios of the first and third gear sets GT1 and GT3 and by the rotation speed difference of the second and third rotation elements N2 and N3 in the planetary gear set PG, and secondarily shifted by the gear ratios of the fifth and sixth gear sets GT5 and GT6, afterwards being transmitted to the first output shaft OS1.

In the instant case, the first synchronizer SM1 is maintained to a neutral state, and the torque of the second input shaft IS2 is not passed to the first output shaft OS1 through the second gear set GT2 and the third gear set GT3.

[Fifth Shift-Stage]

In the fifth shift-stage, while the first clutch CL1 is under operation, the first synchronizer SM1 is controlled to synchronously connect the first shifting gear SG1 and the first output shaft OS1.

As such, by the operation of the first clutch CL1, the torque of the engine ENG is shifted while passing through the first input shaft IS1, the first clutch CL1, the second input shaft IS2, the second gear set GT2, the first output shaft OS1, the first output gear OG1, and the final reduction gear FDG.

In the fifth shift-stage, the torque of the first input shaft IS1 is shifted by the gear ratio of the second gear set GT2, and transmitted to the first output shaft OS1.

In the instant case, the operation of the second synchronizer SM2 to synchronously connect the third shifting gear SG3 or fourth shifting gear SG4 to the first output shaft OS1 does not affect the shifting operation.

[Sixth Shift-Stage]

In the sixth shift-stage, while the first clutch CL1 is under operation, the first synchronizer SM1 is controlled to synchronously connect the second shifting gear SG2 and the first output shaft OS1.

As such, by the operation of the first clutch CL1, the torque of the engine ENG is shifted while passing through the first input shaft IS1, the first clutch CL1, the second input shaft IS2, the third gear set GT4, the first output shaft OS1, the first output gear OG1, and the final reduction gear FDG.

In the sixth shift-stage, the torque of the first input shaft IS1 is shifted by the gear ratio of the third gear set GT4, and transmitted to the first output shaft OS1.

In the instant case, the operation of the second synchronizer SM2 to synchronously connect the third shifting gear SG3 or fourth shifting gear SG4 to the first output shaft OS1 does not affect the shifting operation.

[Seventh Shift-Stage]

In the seventh shift-stage, while the second clutch CL2 is under operation, the second synchronizer SM2 is controlled to synchronously connect the third shifting gear SG3 and the first output shaft OS1.

As such, by the operation of the second clutch CL2, the torque of the engine ENG is shifted while passing through the first input shaft IS1, the second clutch CL2, the third input shaft IS3, the fifth, the fourth gear set GT5 and GT4, the first output shaft OS1, and the first output gear OG1, final reduction gear FDG.

In the seventh shift-stage, the torque of the first input shaft IS1 is shifted by the gear ratio of the fifth and fourth gear sets GT5 and GT4, and transmitted to the first output shaft OS1.

In the instant case, the operation of the first synchronizer SM1 to synchronously connect the first shifting gear SG1 or second shifting gear SG2 to the first output shaft OS1 does not affect the shifting operation.

[Eighth Shift-Stage]

In the eighth shift-stage, while the second clutch CL2 is under operation, the second synchronizer SM2 is controlled to synchronously connect the fourth shifting gear SG4 and the first output shaft OS1.

As such, by the operation of the second clutch CL2, the torque of the engine ENG is shifted while passing through the first input shaft IS1, the second clutch CL2, the third input shaft IS3, the sixth gear set GT6, the first output shaft OS1, the first output gear OG1, and the final reduction gear FDG.

In the eighth shift-stage, the torque of the first input shaft IS1 is shifted by the gear ratio of the sixth gear set GT6, and transmitted to the first output shaft OS1.

In the instant case, the operation of the first synchronizer SM1 to synchronously connect the first shifting gear SG1 or second shifting gear SG2 to the first output shaft OS1 does not affect the shifting operation.

[Ninth Shift-Stage]

In the ninth shift-stage, while the third and fourth clutches CL3 and CL4 are under operation, the first synchronizer SM1 is controlled to synchronously connect the first shifting gear SG1 and the first output shaft OS1.

As such, the torque of the engine ENG is input to the third rotation element N3 of the planetary gear set PG by the operation of the third clutch CL3 through the first input shaft IS1, the first gear set GT1, and the third clutch CL3, and simultaneously input to the first rotation element N1 of the planetary gear set PG by the operation of the fourth clutch CL4 through the first input shaft IS1, the first gear set GT1, and the fourth clutch CL4.

As such, the planetary gear set PG integrally rotates by receiving the same torque of the first input shaft IS1 through the first and third rotation elements N1 and N3, and merely transmits the torque of the first and third rotation elements N1 and N3 to the first and second rotation elements N1 and N2.

The torque of the second rotation element N2 is shifted while passing through the third gear set GT3, the second gear set GT2, the first output shaft OS1, the first output gear OG1, and the final reduction gear FDG to be transmitted to the differential DIFF.

In the ninth shift-stage, the torque of the first input shaft IS1 is shifted by the gear ratio of the first, third, and second gear sets GT1, GT3, and GT2, and transmitted to the first output shaft OS1.

Since the second synchronizer SM2 is maintained to a neutral state, the torque output from the first rotation element N1 of the planetary gear set PG is not transmitted to the first output shaft OS1 and does not affect the shifting operation.

[Tenth Shift-Stage]

In the tenth shift-stage, while the third and fourth clutches CL3 and CL4 are under operation, the first synchronizer SM1 is controlled to synchronously connect the second shifting gear SG2 and the first output shaft OS1.

As such, the torque of the engine ENG is input to the third rotation element N3 of the planetary gear set PG by the operation of the third clutch CL3 through the first input shaft IS1, the first gear set GT1, and the third clutch CL3, and simultaneously input to the first rotation element N1 of the planetary gear set PG by the operation of the fourth clutch CL4 through the first input shaft IS1, the first gear set GT1, and the fourth clutch CL4.

As such, the planetary gear set PG integrally rotates by receiving the same torque of the first input shaft IS1 through the first and third rotation elements N1 and N3, and merely transmits the torque of the first and third rotation elements N1 and N3 to the first and second rotation elements N1 and N2.

The torque of the second rotation element N2 is shifted while passing through the third gear set GT3, the first output shaft OS1, the first output gear OG1, and the final reduction gear FDG to be transmitted to the differential DIFF.

In the tenth shift-stage, the torque of the first input shaft IS1 is shifted by the gear ratios of the first gear set GT1 and the third gear set GT3, and transmitted to the first output shaft OS1.

Since the second synchronizer SM2 is maintained to a neutral state, the torque output from the first rotation element N1 of the planetary gear set PG is not transmitted to the first output shaft OS1 and does not affect the shifting operation.

[Eleventh Shift-Stage]

In the eleventh shift-stage, while the third and fourth clutches CL3 and CL4 are under operation, the second synchronizer SM2 is controlled to synchronously connect the third shifting gear SG3 and the first output shaft OS1.

As such, the torque of the engine ENG is input to the third rotation element N3 of the planetary gear set PG by the operation of the third clutch CL3 through the first input shaft IS1, the first gear set GT1, and the third clutch CL3, and simultaneously input to the first rotation element N1 of the planetary gear set PG by the operation of the fourth clutch CL4 through the first input shaft IS1, the first gear set GT1, and the fourth clutch CL4.

As such, the planetary gear set PG integrally rotates by receiving the same torque of the first input shaft IS1 through the first and third rotation elements N1 and N3, and merely transmits the torque of the first and third rotation elements N1 and N3 to the first and second rotation elements N1 and N2.

The torque of the first rotation element N1 is shifted while passing through the fifth and fourth gear sets GT5 and GT4, the first output shaft OS1, the first output gear OG1, and the final reduction gear FDG to be transmitted to the differential DIFF.

In the eleventh shift-stage, the torque of the first input shaft IS1 is shifted by the gear ratios of the first, fifth, and fourth gear sets GT1, GT5, and GT4, and transmitted to the first output shaft OS1.

Since the first synchronizer SM1 is maintained to a neutral state, the torque output from the second rotation element N2 of the planetary gear set PG is not transmitted to the first output shaft OS1 and does not affect the shifting operation.

[Twelfth Shift-Stage]

In the twelfth shift-stage, while the third and fourth clutches CL3 and CL4 are under operation, the second synchronizer SM2 is controlled to synchronously connect the fourth shifting gear SG4 and the first output shaft OS1.

As such, the torque of the engine ENG is input to the third rotation element N3 of the planetary gear set PG by the operation of the third clutch CL3 through the first input shaft IS1, the first gear set GT1, and the third clutch CL3, and simultaneously input to the first rotation element N1 of the planetary gear set PG by the operation of the fourth clutch CL4 through the first input shaft IS1, the first gear set GT1, and the fourth clutch CL4.

As such, the planetary gear set PG integrally rotates by receiving the same torque of the first input shaft IS1 through the first and third rotation elements N1 and N3, and merely transmits the torque of the first and third rotation elements N1 and N3 to the first and second rotation elements N1 and N2.

The torque of the first rotation element N1 is shifted while passing through the fifth gear set GT5, the sixth gear set GT6, the first output shaft OS1, the first output gear OG1, and the final reduction gear FDG to be transmitted to the differential DIFF.

In the twelfth shift-stage, the torque of the first input shaft IS1 is shifted by the gear ratios of the first, fifth, and sixth gear sets GT1, GT5, and GT6, and transmitted to the first output shaft OS1.

Since the first synchronizer SM1 is maintained to a neutral state, the torque output from the second rotation element N2 of the planetary gear set PG is not transmitted to the first output shaft OS1 and does not affect the shifting operation.

[Thirteenth Shift-Stage]

In the thirteenth shift-stage, while the third clutch CL3 is under operation, the first synchronizer SM1 is controlled to synchronously connect the first shifting gear SG1 and the first output shaft OS1, and the second synchronizer SM2 is controlled to synchronously connect the third shifting gear SG3 and the first output shaft OS1.

As such, by the operation of the first synchronizer SM1, the second rotation element N2 of the planetary gear set PG is connected to the first output shaft OS1 through the third gear set GT3 and the second gear set GT2, and by the operation of the second synchronizer SM2, the first rotation element N1 of the planetary gear set PG is connected to the first output shaft OS1 through the fifth gear set GT5 and the fourth gear set GT4. in the instant state, the torque of the engine ENG is input to the third rotation element N3 of the planetary gear set PG through the first input shaft IS1, the first gear set GT1, and the third clutch CL3.

As a result, the first and second rotation elements N1 and N2 of the planetary gear set PG form a closed torque loop together with the first output shaft OS1. In the instant case, the first rotation element N1 receives a shifted torque according to the gear ratios of the fifth and fourth gear sets GT5 and GT4, and the second rotation element N2 receives a shifted torque according to the gear ratios of the third and second gear sets GT3 and GT2. Therefore, the torque input to the third rotation element N3 is shifted and transmitted through the first output shaft OS1, the first output gear OG1, and the final reduction gear FDG and to the differential DIFF.

[Fourteenth Shift-Stage]

In the fourteenth shift-stage, while the third clutch CL3 is under operation, the first synchronizer SM1 is controlled to synchronously connect the first shifting gear SG1 and the first output shaft OS1, and the second synchronizer SM2 is controlled to synchronously connect the fourth shifting gear SG4 and the first output shaft OS1.

As such, by the operation of the first synchronizer SM1, the second rotation element N2 of the planetary gear set PG is connected to the first output shaft OS1 through the third gear set GT3 and the second gear set GT2, and by the operation of the second synchronizer SM2, the first rotation element N1 of the planetary gear set PG is connected to the first output shaft OS1 through the fifth gear set GT5 and the sixth gear set GT6. in the instant state, the torque of the engine ENG is input to the third rotation element N3 of the planetary gear set PG through the first input shaft IS1, the first gear set GT1, and the third clutch CL3.

As a result, the first and second rotation elements N1 and N2 of the planetary gear set PG form a closed torque loop together with the first output shaft OS1. In the instant case, the first rotation element N1 receives a shifted torque according to the gear ratios of the fifth and sixth gear sets GT5 and GT6, and the second rotation element N2 receives a shifted torque according to the gear ratios of the third and second gear sets GT3 and GT2. Therefore, the torque input to the third rotation element N3 is shifted and transmitted through the first output shaft OS1, the first output gear OG1, and the final reduction gear FDG and to the differential DIFF.

[Fifteenth Shift-Stage]

In the fifteenth shift-stage, while the third clutch CL3 is under operation, the first synchronizer SM1 is controlled to synchronously connect the second shifting gear SG2 and the first output shaft OS1, and the second synchronizer SM2 is controlled to synchronously connect the third shifting gear SG3 and the first output shaft OS1.

As such, by the operation of the first synchronizer SM1, the second rotation element N2 of the planetary gear set PG is connected to the first output shaft OS1 through the third gear set GT3, and by the operation of the second synchronizer SM2, the first rotation element N1 of the planetary gear set PG is connected to the first output shaft OS1 through the fifth gear set GT5 and the fourth gear set GT4. in the instant state, the torque of the engine ENG is input to the third rotation element N3 of the planetary gear set PG through the first input shaft IS1, the first gear set GT1, and the third clutch CL3.

As a result, the first and second rotation elements N1 and N2 of the planetary gear set PG form a closed torque loop together with the first output shaft OS1. In the instant case, the first rotation element N1 receives a shifted torque according to the gear ratios of the fifth and fourth gear sets GT5 and GT4, and the second rotation element N2 receives a shifted torque according to the gear ratios of the third gear set GT3. Therefore, the torque input to the third rotation element N3 is shifted and transmitted through the first output shaft OS1, the first output gear OG1, and the final reduction gear FDG and to the differential DIFF.

[Sixteenth Shift-Stage]

In the sixteenth shift-stage, while the third clutch CL3 is under operation, the first synchronizer SM1 is controlled to synchronously connect the second shifting gear SG2 and the first output shaft OS1, and the second synchronizer SM2 is controlled to synchronously connect the fourth shifting gear SG4 and the first output shaft OS1.

As such, by the operation of the first synchronizer SM1, the second rotation element N2 of the planetary gear set PG is connected to the first output shaft OS1 through the third gear set GT3, and by the operation of the second synchronizer SM2, the first rotation element N1 of the planetary gear set PG is connected to the first output shaft OS1 through the fifth gear set GT5 and the sixth gear set GT6. in the instant state, the torque of the engine ENG is input to the third rotation element N3 of the planetary gear set PG through the first input shaft IS1, the first gear set GT1, and the third clutch CL3.

As a result, the first and second rotation elements N1 and N2 of the planetary gear set PG form a closed torque loop together with the first output shaft OS1. In the instant case, the first rotation element N1 receives a shifted torque according to the gear ratios of the fifth and sixth gear sets GT5 and GT6, and the second rotation element N2 receives a shifted torque according to the gear ratios of the third gear set GT3. Therefore, the torque input to the third rotation element N3 is shifted and transmitted through the first output shaft OS1, the first output gear OG1, and the final reduction gear FDG and to the differential DIFF.

As a result, a transmission of desired number of shifting stages with desired gear ratio may be designed with reference to the gear ratios of the sixteen shifting stages. For example, as shown in FIG. 2, a transmission of forward nine speeds and one reverse speed may be designed using first, second, fifth, sixth, seventh, eighth, ninth, tenth, thirteenth, and sixteenth shifting stages.

Figure 3:
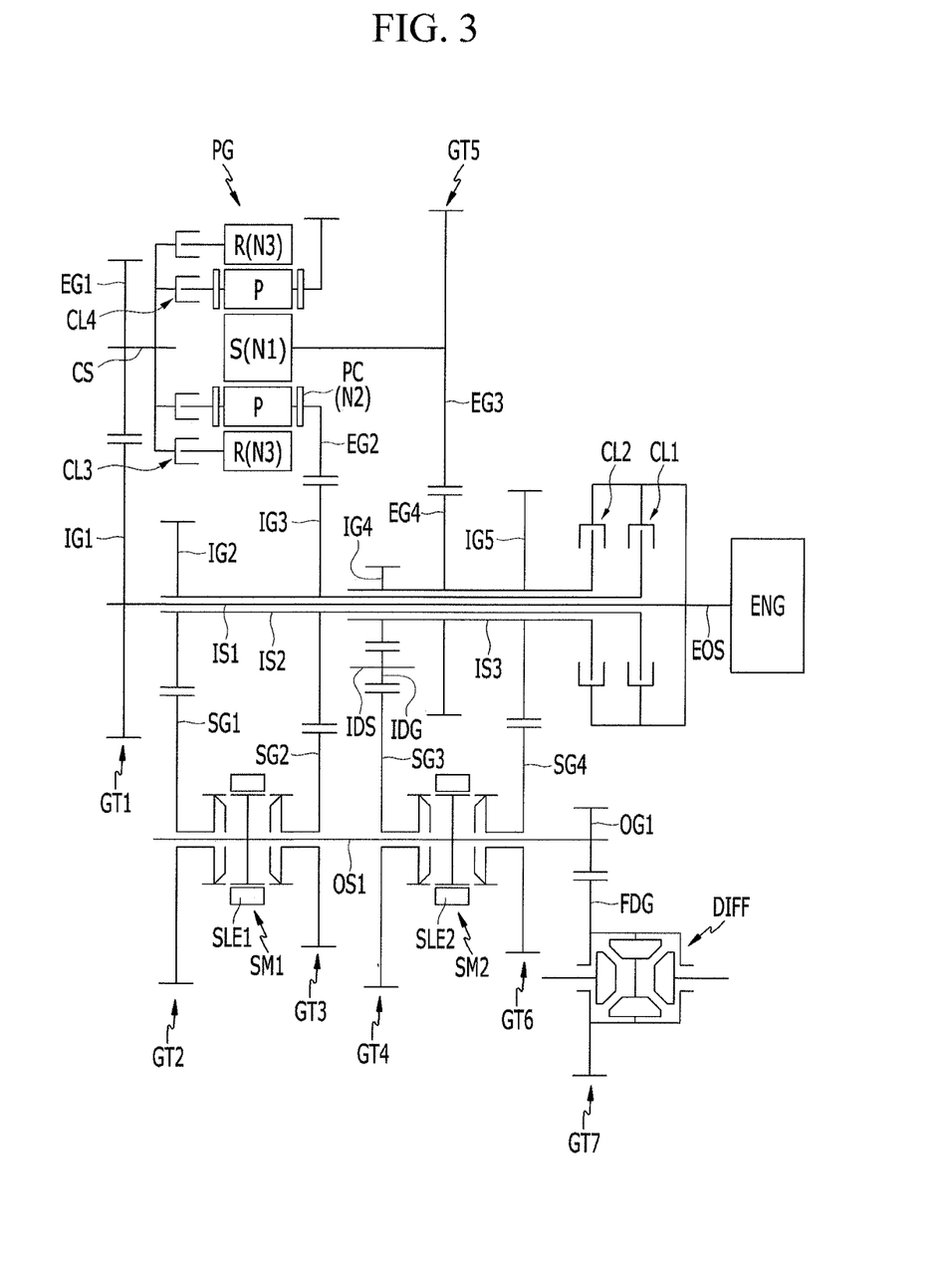
FIG. 3 is a schematic view of a power transmission apparatus configured for a vehicle according to various exemplary embodiments of the present invention.

FIG. 3 is a schematic view of a power transmission apparatus according to various exemplary embodiments of the present invention.

Referring to FIG. 3, in various exemplary embodiments of the present invention, the fourth clutch CL4 is mounted between the intermediate shaft CS and the second rotation element N2 (planet carrier PC) of the planetary gear set PG, in comparison with the various exemplary embodiments where the fourth clutch CL4 is mounted between the intermediate shaft CS and the first rotation element N1 (sun gear S) of the planetary gear set PG in FIG. 1.

The various exemplary embodiments only differ from the various exemplary embodiments in the location of the fourth clutch CL4, providing the same shafting operation and effect, which is therefore not described in further detail.

Figure 4:
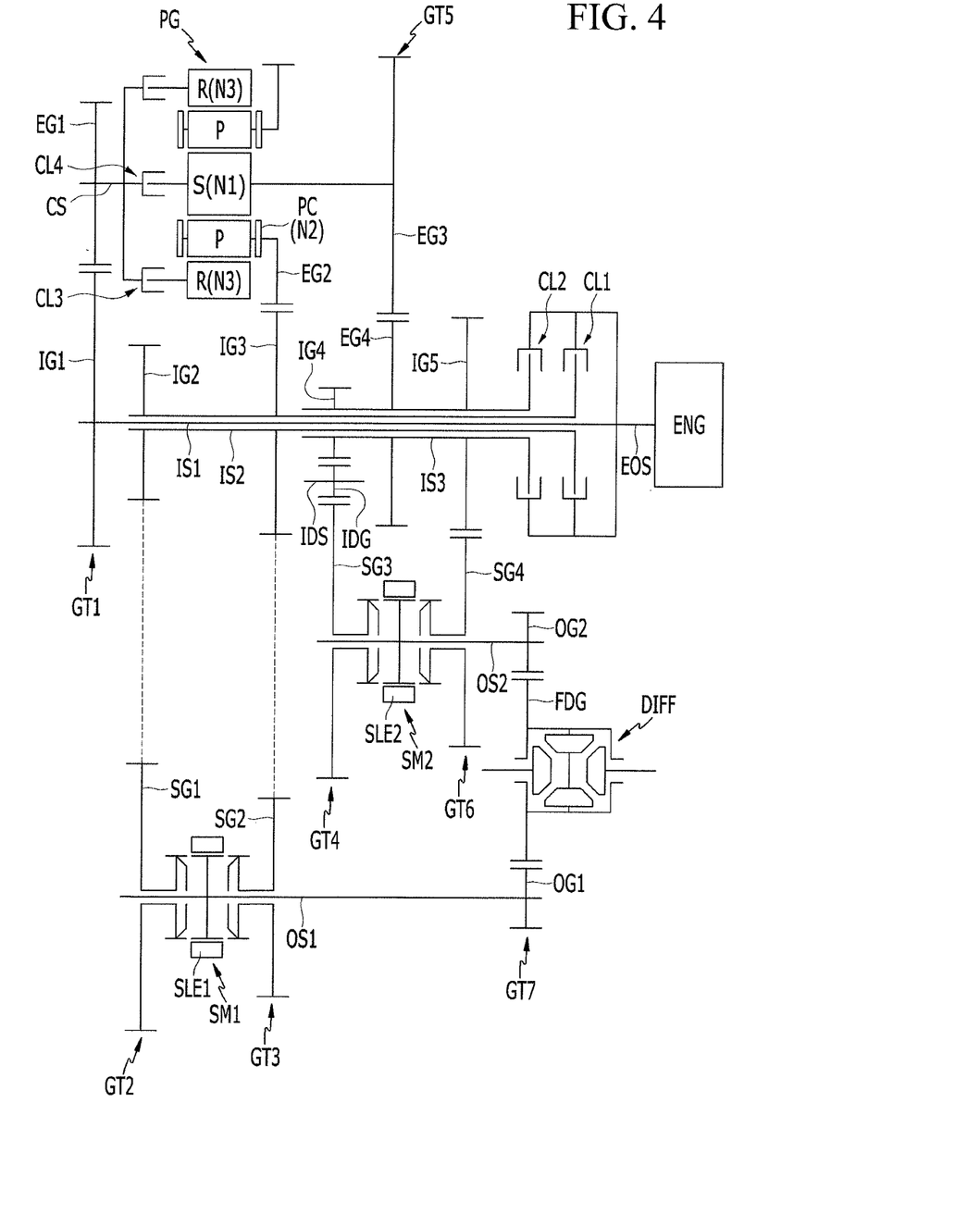
FIG. 4 is a schematic view of a power transmission apparatus configured for a vehicle according to various exemplary embodiments of the present invention.

FIG. 4 is a schematic view of a power transmission apparatus according to various exemplary embodiments of the present invention.

Referring to FIG. 4, in various exemplary embodiments in comparison with the various exemplary embodiments of the present invention in FIG. 1, the first output shaft OS1 is split into first and second output shafts OS1 and OS2, where the first synchronizer SM1 is mounted on the first output shaft OS1, and the second synchronizer SM2 is mounted on the second output shaft OS2.

Therefore, the first output shaft OS1 may transmit a torque from the second and third gear sets GT2 and GT3 to the differential DIFF through the first output gear OG1 and the final reduction gear FDG in the seventh gear set GT7. The second output shaft OS2 may transmit a torque from the fourth, sixth gear set GT4 and GT6 to the differential DIFF through the second output gear OG2 and the final reduction gear FDG in the seventh gear set GT7.

As a result, final reduction gear ratio may be differently designed from the various exemplary embodiments by the first and second output gears OS1 and OS2.

Figure 5:
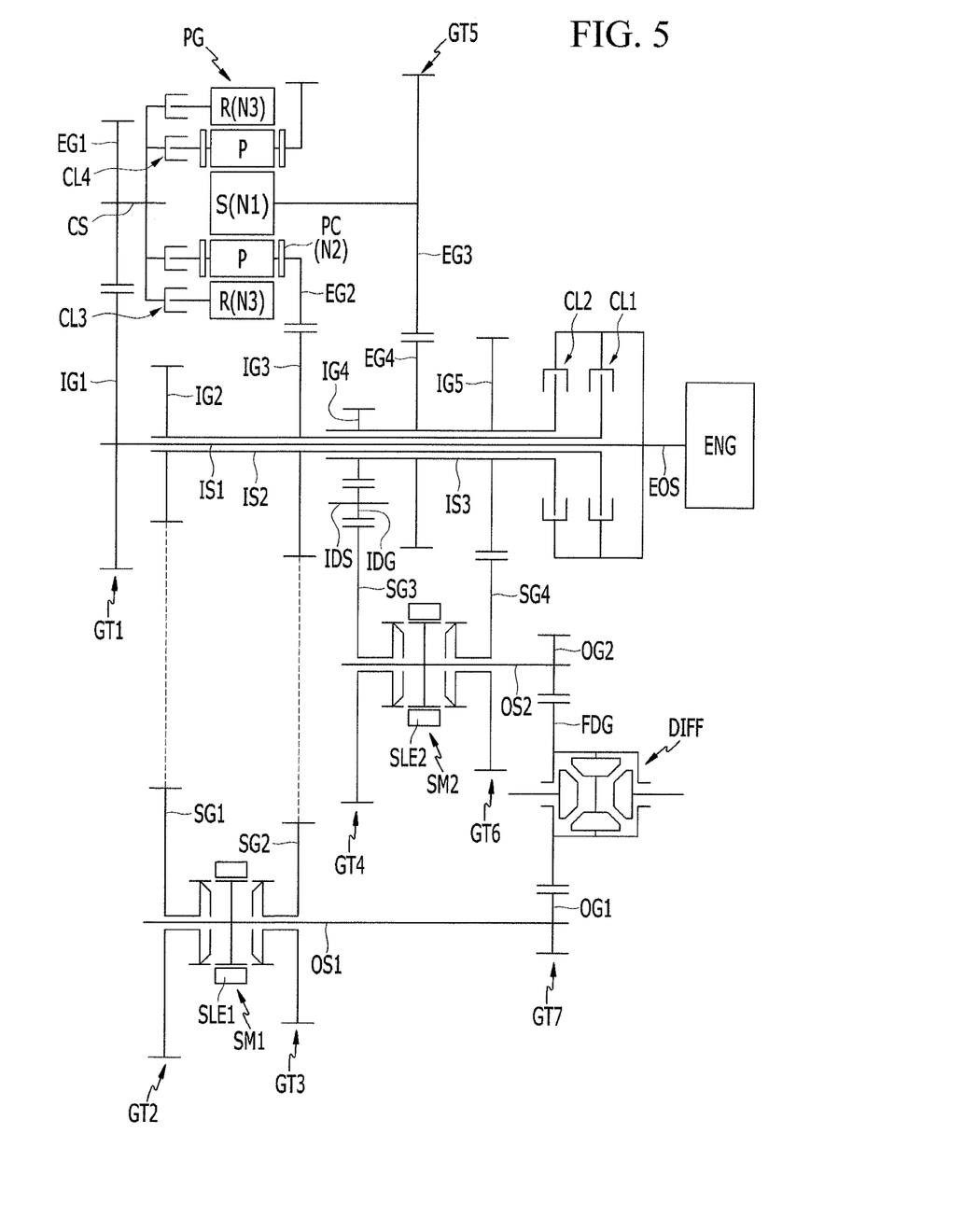
FIG. 5 is a schematic view of a power transmission apparatus configured for a vehicle according to various exemplary embodiments of the present invention.

FIG. 5 is a schematic view of a power transmission apparatus according to various exemplary embodiments of the present invention.

Referring to FIG. 5, in various exemplary embodiments of the present invention, the fourth clutch CL4 is mounted between the intermediate shaft CS and the second rotation element N2 (planet carrier PC) of the planetary gear set PG, in comparison with the various exemplary embodiments where the fourth clutch CL4 is mounted between the intermediate shaft CS and the first rotation element N1 (sun gear S) of the planetary gear set PG in FIG. 4.

The various exemplary embodiments only differ from the various exemplary embodiments in the location of the fourth clutch CL4, providing the same shafting operation and effect, which is therefore not described in further detail.

As described above, a power transmission apparatus for a vehicle according to an exemplary embodiment of the present invention may realize sixteen shifting stages by combining one simple planetary gear set and two synchronizers to basic four-speed dual-clutch transmission (DCT) structure.

Furthermore, according to a power transmission apparatus for a vehicle according to an exemplary embodiment of the present invention, desired shifting stages may be selected from the sixteen shifting stages, and therefore, a transmission may be easily optimized for various specifications of vehicles, facilitating vehicle-specifically improvement of power delivery performance and fuel consumption.

Furthermore, according to a power transmission apparatus for a vehicle according to an exemplary embodiment of the present invention, a transmission may be down-sized by employing a simple four-speed dual-clutch transmission (DCT) structure, also improving installability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a vehicle, the power transmission apparatus comprising:

a first input shaft fixedly connected to an engine output shaft fixedly connected to an engine;

a second input shaft formed as a hollow shaft, mounted coaxial with and external to the first input shaft without rotational interference therebetween, and selectively connectable to the first input shaft;

a third input shaft formed as a hollow shaft, mounted coaxial with and external to the second input shaft, and selectively connectable to the first input shaft;

an intermediate shaft, an idle shaft, and at least one output shaft mounted in parallel with the first, second, and third input shafts;

a planetary gear set having a first rotation element, a second rotation element, and a third rotation element and mounted on an axis of the intermediate shaft, wherein the third rotation element and one of the first rotation element and the second rotation element are selectively connectable to the intermediate shaft, and wherein the first rotation element and the second rotation element are engaged to the third and second input shafts, respectively;

a plurality of gear sets which allow torque flow between the intermediate shaft, the first, second, and third input shafts, the idle shaft, the at least one output shaft, and the planetary gear set;

a first synchronizer mounted on the at least one output shaft, selectively receiving a torque from the second input shaft through two paths, and transmitting the received torque to the at least one output shaft;

a second synchronizer mounted on the at least one output shaft, selectively receiving a torque from the third input shaft through two paths, and transmitting the received torque to the at least one output shaft; and four clutches.

2. The power transmission apparatus of claim 1,
wherein the at least one output shaft includes a first output shaft mounted in a torque path between the second and third input shafts and a differential.

3. The power transmission apparatus of claim 2,
wherein the first and third rotation elements of the planetary gear set are selectively connectable to the intermediate shaft.

4. The power transmission apparatus of claim 3, wherein the four clutches include:
a first clutch mounted between the first input shaft and the second input shaft;
a second clutch mounted between the first input shaft and the third input shaft;
a third clutch mounted between the intermediate shaft and the third rotation element of the planetary gear set; and
a fourth clutch mounted between the intermediate shaft and the first rotation element of the planetary gear set.

5. The power transmission apparatus of claim 2,
wherein the second and third rotation elements of the planetary gear set are selectively connectable to the intermediate shaft.

6. The power transmission apparatus of claim 5, wherein the four clutches include:
a first clutch mounted between the first input shaft and the second input shaft;
a second clutch mounted between the first input shaft and the third input shaft;
a third clutch mounted between the intermediate shaft and the third rotation element of the planetary gear set; and
a fourth clutch mounted between the intermediate shaft and the second rotation element of the planetary gear set.

7. The power transmission apparatus of claim 2, wherein the plurality of gear sets includes:
a first gear set including a first input gear and a first gear, the first input gear being fixedly connected to the first input shaft, the first gear being fixedly connected to the intermediate shaft and gear-engaged with the first input gear;
a second gear set including a second input gear and a first shifting gear, the second input gear being fixedly connected to the second input shaft, the first shifting gear being rotatably mounted on the output shaft and gear-engaged with the second input gear;
a third gear set including a second gear, a third input gear, and a second shifting gear, the second gear being fixedly connected to the second rotation element of the planetary gear set, the third input gear being fixedly connected to the second input shaft and gear-engaged with the second gear, and the second shifting gear being rotatably mounted on the output shaft and gear-engaged with the third input gear;
a fourth gear set including a fourth input gear, a third shifting gear, and an idle gear, the fourth input gear being fixedly connected to the third input shaft, the third shifting gear being rotatably mounted on the output shaft, the idle gear being fixedly connected to the idle shaft and gear-engaged with the fourth input gear and the third shifting gear;
a fifth gear set including a third gear and a fourth gear, the third gear being fixedly connected to the first rotation element of the planetary gear set, the fourth gear being fixedly connected to the third input shaft and gear-engaged with the third gear; and
a sixth gear set including a fifth input gear and a fourth shifting gear, the fifth input gear being fixedly connected to the third input shaft, the fourth shifting gear being rotatably mounted on the output shaft and gear-engaged with the fifth input gear.

8. The power transmission apparatus of claim 7,
wherein the plurality of gear sets further include a seventh gear set including a final reduction gear of a differential, and a first output gear fixedly connected to the output shaft and gear-engaged with the final reduction gear.

9. The power transmission apparatus of claim 7,
wherein the first, second, third, fourth, fifth, and sixth gear sets are mounted in series of the sixth, fifth, fourth, third, second, and first gear sets from an engine output shaft side of the transmission apparatus.

10. The power transmission apparatus of claim 7,
wherein the first synchronizer is configured to selectively connect one of the first shifting gear of the second gear set and the second shifting gear of the third gear set to the output shaft, and
wherein the second synchronizer is configured to selectively connect one of the third shifting gear of the fourth gear set and the fourth shifting gear of the sixth gear set to the output shaft.

11. The power transmission apparatus of claim 1, wherein the at least one output shaft includes a first output shaft mounted in a torque path between the second input shaft and a differential, and
further including a second output shaft
mounted in a torque path between the third input shaft and the differential.

12. The power transmission apparatus of claim 11,
wherein the first and third rotation elements of the planetary gear set are selectively connectable to the intermediate shaft.

13. The power transmission apparatus of claim 12, wherein the four clutches include:
a first clutch mounted between the first input shaft and the second input shaft;
a second clutch mounted between the first input shaft and the third input shaft;
a third clutch mounted between the intermediate shaft and the third rotation element of the planetary gear set; and
a fourth clutch mounted between the intermediate shaft and the first rotation element of the planetary gear set.

14. The power transmission apparatus of claim 11,
wherein the second and third rotation elements of the planetary gear set are selectively connectable to the intermediate shaft.

15. The power transmission apparatus of claim 14, wherein the four clutches include:
a first clutch mounted between the first input shaft and the second input shaft;
a second clutch mounted between the first input shaft and the third input shaft;
a third clutch mounted between the intermediate shaft and the third rotation element of the planetary gear set; and
a fourth clutch mounted between the intermediate shaft and the second rotation element of the planetary gear set.

16. The power transmission apparatus of claim 11, wherein the plurality of gear sets include:
- a first gear set including a first input gear and a first gear, the first input gear being fixedly connected to the first input shaft, the first gear being fixedly connected to the intermediate shaft and gear-engaged with the first input gear;
- a second gear set including a second input gear and a first shifting gear, the second input gear being fixedly connected to the second input shaft, the first shifting gear being rotatably mounted on the first output shaft and gear-engaged with the second input gear;
- a third gear set including a second gear, a third input gear, and a second shifting gear, the second gear being fixedly connected to the second rotation element of the planetary gear set, the third input gear being fixedly connected to the second input shaft and gear-engaged with the second gear, and the second shifting gear being rotatably mounted on the first output shaft and gear-engaged with the third input gear;
- a fourth gear set including a fourth input gear, a third shifting gear, and an idle gear, the fourth input gear being fixedly connected to the third input shaft, the third shifting gear being rotatably mounted on the second output shaft, and the idle gear fixedly connected to the idle shaft and gear-engaged with the fourth input gear and the third shifting gear;
- a fifth gear set including a third gear and a fourth gear, the third gear being fixedly connected to the first rotation element of the planetary gear set, the fourth gear being fixedly connected to the third input shaft and gear-engaged with the third gear; and
- a sixth gear set including a fifth input gear and a fourth shifting gear, the fifth input gear being fixedly connected to the third input shaft, the fourth shifting gear being rotatably mounted on the second output shaft and gear-engaged with the fifth input gear.

17. The power transmission apparatus of claim 16, wherein the plurality of gear sets further include a seventh gear set that includes a final reduction gear of a differential, and first and second output gears, the first and second output gears being fixedly connected to the first output shaft and the second output shaft, respectively, and gear-engaged with the final reduction gear.

18. The power transmission apparatus of claim 16, wherein the first, second, third, fourth, fifth, and sixth gear sets are mounted in series of the sixth, fifth, fourth, third, second and first gear sets from an engine output shaft side of the transmission apparatus.

19. The power transmission apparatus of claim 16, wherein the first synchronizer is configured to selectively connect one of the first shifting gear of the second gear set and the second shifting gear of the third gear set to the first output shaft, and
wherein the second synchronizer is configured to selectively connect one of the third shifting gear of the fourth gear set and the fourth shifting gear of the sixth gear set to the second output shaft.

20. The power transmission apparatus of claim 1, wherein the planetary gear set is a single pinion planetary gear set having a sun gear, a planet carrier, and a ring gear as the first rotation element, the second rotation element and the third rotation element, respectively.

\* \* \* \* \*